Patented Apr. 16, 1940

2,197,105

UNITED STATES PATENT OFFICE 2,197,105

ALICYCLIC HYDROXY ETHERS

Harold S. Holt, Wilmington, Del., assignor to E. I. du Pont de Nemours & Company, Wilmington, Del., a corporation of Delaware No Drawing. Application December 10, 1937, Serial No. 179,192

9 Claims. (Cl. 260—611)

This invention relates to organic hydroxy ethers and more particularly to alicyclic organic hydroxy ethers.

This invention has as an object the preparation of new compounds. A further object is the preparation of new compounds useful as intermediates in the manufacture of resins, plasticizers, surface active agents, detergents, wetting agents, as softeners for regenerated cellulose films, casein, gelatin, and glue compositions and in certain cases as adhesives. Other objects will appear hereinafter.

These objects are accomplished by the following invention which includes in its scope products of the following general formula:

wherein Q is a divalent alicyclic hydrocarbon radical having the OH and OR groups attached to adjacent carbon atoms of the same alicyclic carbon ring and R is:

(a) A monovalent aliphatic (including cycloaliphatic) hydrocarbon radical of at least six carbon atoms, which may be straight or branched chain and may contain one or more double bonds, for example, 2-ethylhexyl, dodecyl, octadecyl, 9,10-octadecenyl, 2',4',-dimethylpentyl, tetradecyl, pentadecyl, cetyl, octyl, docosyl, 2-octyl, undecyl, geranyl, linolyl citronellyl rhodinyl, docosenyl, and radicals of alcohols obtainable from drying and semi-drying oils by the process of Scott & Hansley, U. S. Patent 2,019,022;

(b) A hydroxy hydrocarbon group containing at least two carbon atoms and at least one hydroxyl group, for example, hydroxyethyl, hydroxypropyl, hydroxybutyl, hydroxyhexyl, dihydroxypropyl—CH₂—CHOH—CH₂OH, tris(hydroxymethyl)ethyl—CH₂—C(CH₂OH)₃, bis(hydroxymethyl)ethyl—CH₂—CH(CH₂OH)₂, sorbityl, arabityl, xylityl, mannityl, erythrityl, hydroxymethylbenzyl;

(c) A hydroxyether group containing at least four carbon atoms, at least one hydroxyl group and at least one ether group, for example hydroxyethoxyethyl—
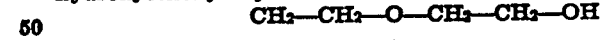

hydroxyethoxy—ethoxyethyl—
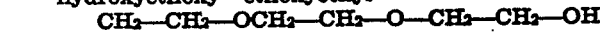

and the hydroxypropoxypropyl, hydroxyethoxypropyl, the radicals from monomethylin, mono-ethylin, monobenzylin, monobutylin, sorbitol dimethyl, diethyl, dibenzyl, etc., ethers;

(d) An ether group, e. g., those obtained from dibenzylin, dimethylin, methyl, ethyl and butyl "Cellosolve," diethylin, dibutylin and similar ethers of polyhydric alcohols containing but one free hydroxyl group, i. e., the radical of a monohydric ether alcohol or monovalent ether-hydrocarbon radical.

Compounds coming within phase (a) of the general formula are prepared by reacting a hydroaromatic epoxy compound or a hydroaromatic oxide with a monohydric alcohol of at least six carbon atoms, e. g., 2-ethylhexanol, dodecyl alcohol, 9,10-octadecenyl alcohol, octadecyl alcohol, benzyl alcohol, phenylethyl alcohol, cyclohexanol, etc.

Compounds coming within phase (b) of the general formula are prepared by reacting a hydroaromatic epoxy compound or oxide with glycols, e. g., ethylene glycol, butylene glycol, hexamethylene glycol, propylene glycol, or with higher polyhydric alcohols, for example, tri-, tetra-, penta- or hexahydric alcohols exemplified by glycerol, pentaerythrite, glucose, sorbitol, arabitol, xylitol, mannitol, erythritol.

Compounds coming within phase (c) of the general formula are prepared by reacting a hydroaromatic epoxy compound or oxide with ether polyhydric alcohols, e. g., diethylene glycol, triethylene glycol, sorbitol monomethyl ether, starch monomethyl ether, starch, glucose, inulin, etc.

Compounds coming within phase (d) of the general formula are prepared by reacting a hydroaromatic epoxy compound, i. e., an alicyclic oxide with a monohydric ether alcohol, for example, the monoethyl ether of ethylene glycol, the monobutyl ether of ethylene glycol, the dimethyl or diethyl ethers of glycerol, the dibenzyl ether of glycerol, the monomethyl ether of cyclohexene glycol, tetrahydro furfuryl alcohol, etc.

The more detailed practice of the invention is illustrated by the following examples, wherein parts given are by weight unless otherwise stated. There are of course many forms of the invention other than these specific embodiments.

EXAMPLE I

*Hydroxycyclohexyl octadecyl ether*

Four-tenths gram of sodium dissolved in 10 cc. of methyl alcohol was added to 319 gms. of stearyl alcohol (M. P. 56–75° C.) and the mixture was heated over night at 115° C. Seventy-five grams of cyclohexene oxide was then added and the temperature was raised to 150° C. and held at this point for 16 hours. The reaction mixture was further heated to 190° C. for 3 hours and then distilled under vacuum. After removal of unreacted cyclohexene oxide (32 gms.) and unreacted stearyl alcohol (230 gms.) there was obtained 103 gms. of hydroxycyclohexyl octadecyl ether boiling at 208–225° C. at 1 mm. pressure. This is a yield of 83% based on reacted cyclohexene oxide. Hydroxycyclohexyl stearyl ether is a white waxy solid. Analysis for acetyl value gave 158 as compared with a theoretical acetyl value of 151.

Example II

*Hydroxycyclohexyl-9,10-octadecenyl ether*

One gram of sodium dissolved in the smallest possible amount of methanol was mixed with 368 gms. of 9,10-octadecenyl alcohol iodine No. 83, ref. index $N_D^{25} = 1.4588$ and the mixture was heated to expel the methanol. The resulting product was mixed with 98 gms. cyclohexene oxide and the mixture heated to 180° C. for 24 hours after which it was fractionated. A yield of 163 gms. hydroxycyclohexyl octadecenyl ether boiling at 180–215° C. at 1 mm. pressure was obtained.

Example III

*Hydroxycyclohexyl ether of branched chain saturated alcohols having twelve to fourteen carbon atoms*

Branched chain saturated aliphatic alcohols of twelve to fourteen carbon atoms and boiling from 200–260° C. may be obtained in the synthesis of methanol from carbon monoxide and hydrogen as is more fully described in J. Ind. & Eng. Chem. 23, 1381 (1931).

One gram of sodium was dissolved in 550 gms. of the above alcohol mixture after which 150 gms. cyclohexene oxide was added and the mixture heated at 180° C. for 15 hours. After distilling off unreacted cyclohexene oxide and alcohols there was obtained 58 gms. of the corresponding alkoxy cyclohexanols with a boiling range of 140–159° C. at 5 mm. pressure and an average hydroxyl number of 248.5.

Example IV

*Hydroxycyclohexyl monoether of ethylene glycol*

Three hundred and ten grams of distilled ethylene glycol and 98 gms. of cyclohexene oxide were heated for 4 hours at 200° C. without any catalyst. The reaction mass was then distilled in vacuo giving 274 gms. of unreacted ethylene glycol and 116 gms. of product, namely the hydroxy cyclohexyl monoether of ethylene glycol or 2 - (β - hydroxy - ethoxy) - cyclohexanol-1. This material boils at 128–130° C. at 3 mm. The yield was 72.5% of theoretical based on the cyclohexene oxide used.

Example V

*Hydroxycyclohexyl monoether of diethylene glycol*

Two hundred and ten grams of diethylene glycol and 49 gms. of cyclohexene oxide were heated together at 200° C. At first the cyclohexene oxide refluxed, but as reaction occurred this gradually stopped. After 6 hours at 200° C., the reaction mass was vacuum distilled. One hundred and seventy grams of unreacted diethylene glycol was recovered along with 61 gms. of the desired product, i. e., the hydroxy-cyclohexyl monoether of diethylene glycol or 2-β-(β'-hydroxyethoxy)-ethoxy-cyclohexanol-1. This material boils at 160–180° C. at 10 mm. The yield was 59.8% of the theory based on the cyclohexene oxide used.

Example VI

*Hydroxycyclohexyl monoether of glycerol*

Four hundred and sixty grams of glycerol and 98 g. of cyclohexene oxide were heated together at 150° C. for 10 hours without catalyst. The reaction mass was vacuum distilled. Three hundred and forty-five grams of glycerol was recovered and 72 gms. of the hydroxycyclohexyl monoether of glycerol or 2(α-glyceroxy) cyclohexanol-1 was obtained. This material boils at 180° C. at 4 mm. The yield was 38% of theory based on the cyclohexene oxide used.

In the above examples an excess of the alcohol constituent is always used to minimize reaction between the alkoxy cyclohexanol formed, with unreacted cyclohexene oxide. If this is not done a mixture of products is obtained. This mixture contains varying quantities of the monoether which may be separated therefrom.

The most useful catalysts for the above reactions are the sodium alcoholates of the alcohol used. Potassium and lithium alcoholates while useful, are less desirable.

In the absence of catalysts, high temperature and pressures are required to cause reaction. With the higher boiling alcohols, glycols, and higher polyhydric alcohols, catalysts are not necessary, although desirable.

The invention is generic to hydroaromatic epoxy compounds in general. The hydroaromatic or alicyclic epoxy compound or oxide is defined as an alicyclic compound having two adjacent carbon atoms joined to an ether oxygen, i. e., it contains an alicyclic ring which has two carbon atoms in common with a

ring. The following are examples of these compounds and may be substituted for the cyclohexene oxide of the above examples: dihydronaphthalene oxide, the oxides from cyclohexylcyclohexene, dihydroretene, dihydroanthracene, dihydrophenanthrene, phenylcyclohexene, etc. The first two oxides named are preferred because of their present availability.

The compounds of the present invention are generally prepared by the reaction of an alicyclic oxide with a suitable alcohol. One class of alcohols is that of polyhydric alcohols and ethers thereof containing at least one free hydroxyl group. This latter class of alcohols may also be defined as alcohols having a plurality of "oxy" oxygens, i. e., oxygens, one valence of which is attached to a carbon atom and the other valence is attached either to hydrogen or to a different carbon atom. This reaction of the alicyclic oxide with an alcohol containing a plurality of "oxy" oxygens forms a preferred modification of my invention. This class includes dihydric alcohols or glycols, e. g., ethylene glycol, propylene glycol, cyclohexanediol, butylene glycol, octadecanediol, hexamethylene glycol, xylylene glycol, and ether glycols such as diethylene glycol, tri-ethylene glycol, etc., polyhydric alcohols, e. g., glycerol, pentaerythrite, trimethylolethylmethane, glucose, starch, xylose, maltose, inulin, dextrin, fructose, and monohydric ether alcohols, e. g., ethylene glycol monomethyl, monoethyl, monobutyl, etc., ethers, tetrahydrofurfuryl alcohol, anisyl alcohol, etc. The compounds of phases *b*, *c*, and *d*, above, of the general formula

may be thus prepared.

Another class of alcohols is that of monohydric alcohols of at least six carbon atoms. This class includes monohydric straight or branched chain aliphatic, alicyclic, heterocyclic, and aromatic alcohols containing at least six carbon atoms, e. g., hydroabietyl, cyclohexyl, cinnamyl, benzyl, phenylethyl, abietyl, hexyl methylcyclohexyl, 2-ethylhexyl, octyl, decyl, 2,4-dimethylpentyl, dodecyl, octadecyl, 9,10-octadecenyl alcohols.

The reaction may be carried out under pressure or at atmospheric pressure, in the presence or absence of a solvent or inert diluent. An entraining liquid may be used in the distillation.

The products of this invention are useful as intermediates in the preparation of numerous articles of commerce. Thus the alkoxy cyclohexanols derived from long chain alcohols may be sulfated to form valuable detergents and wetting agents. Alkoxy cyclohexanols derived from glycols, glycerol, etc., are high boiling, colorless, water soluble liquids which may be used for softeners for casein, gelatin and glue compositions. They may also be reacted with polybasic acids to give resins of the alkyd type. Esters derived from certain alkoxy cyclohexanols by reaction with acetic or other acids are compatible with nitrocellulose and cellulose acetate and may be used as plasticizers for these materials in coating compositions, molded articles, etc. Alkoxy cyclohexanols derived from starch have valuable adhesive properties.

The above description and examples are intended to be illustrative only. Any modification of or variation therefrom which conforms to the spirit of the invention is intended to be included within the scope of the claims.

I claim:

1. Dodecyl monoether of cyclohexylene glycol.
2. Monoethers of alicyclic glycols having their hydroxyls on adjacent carbons of the same alicyclic ring with monohydric alcohols ROH, wherein R is an aliphatic, including cycloaliphatic hydrocarbon radical having at least six carbon atoms.
3. Monoethers of cyclohexylene glycol with monohydric alcohols ROH, wherein R is an aliphatic, including cycloaliphatic hydrocarbon radical having at least six carbon atoms.
4. Monoethers of alicyclic glycols, said ethers having the formula

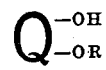

wherein Q is a divalent alicyclic hydrocarbon radical having the OH and OR groups attached to adjacent carbon atoms of the same alicyclic ring and R is a member of the class consisting of monovalent aliphatic (including cycloaliphatic) hydrocarbon radicals of at least six carbon atoms and monovalent aliphatic (including cycloaliphatic) radicals having at least one oxygen of the class consisting of hydroxyl oxygen and ether oxygen.

5. Monoethers of alicyclic glycols, said ethers having the formula

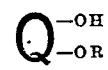

wherein Q is a divalent alicyclic hydrocarbon radical having the OH and OR groups attached to adjacent carbon atoms of the same alicyclic ring and R is a monovalent aliphatic (including cycloaliphatic) radical having at least one oxygen of the class consisting of hydroxyl oxygen and ether oxygen.

6. A monoether of cyclohexylene glycol, said ethers having the formula

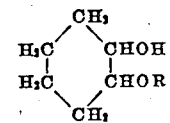

wherein R is a monovalent aliphatic (including cycloaliphatic) radical having at least one oxygen of the class consisting of hydroxyl oxygen and ether oxygen.

7. A monoether of cyclohexylene glycol and a polyhydric alcohol, said ether having the formula

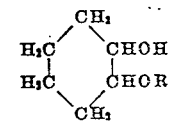

wherein R is the residue obtained by removing one hydroxyl from a polyhydric alcohol.

8. The mono (dihydroxypropyl) ether of cyclohexylene glycol.
9. The mono (hydroxyethyl) ether of cyclohexylene glycol.

HAROLD S. HOLT.

CERTIFICATE OF CORRECTION.

Patent No. 2,197,105.　　　　　　　　　　　　　　　　April 16, 1940.

HAROLD S. HOLT.

It is hereby certified that error appears in the printed specification of the above numbered patent requiring correction as follows: Page 1, first column, line 31, after the word "linolyl" and after the word "citronellyl" insert a comma; page 3, first column, line 19, after "hexyl" insert a comma; line 34, after the words "used for" insert --softening regenerated cellulose film and as--; and that the said Letters Patent should be read with this correction therein that the same may conform to the record of the case in the Patent Office.

Signed and sealed this 9th day of July, A. D. 1940.

(Seal)

Henry Van Arsdale,
Acting Commissioner of Patents.